United States Patent [19]

Moan

[11] Patent Number: 4,767,384

[45] Date of Patent: Aug. 30, 1988

[54] FLUID PRESSURE AMPLIFIER FOR AN INFINITELY VARIABLE DRIVE

[75] Inventor: Richard D. Moan, Livonia, Mich.

[73] Assignee: Ford Motor Company, Dearborn, Mich.

[21] Appl. No.: 34,249

[22] Filed: Apr. 6, 1987

[51] Int. Cl.[4] .............................................. F16H 11/02
[52] U.S. Cl. ......................................... 474/28; 74/868
[58] Field of Search ...................... 474/28, 18; 74/865, 74/867, 868

[56] References Cited

U.S. PATENT DOCUMENTS

| | | | |
|---|---|---|---|
| 2,826,149 | 3/1958 | Wrigley | 417/225 |
| 2,881,706 | 4/1959 | Haynes et al. | 417/225 |
| 3,016,710 | 1/1962 | Kurz et al. | 417/225 |
| 3,115,049 | 12/1963 | Moan | 474/28 |
| 3,600,960 | 8/1971 | Karig et al. | 474/28 |
| 4,292,031 | 9/1981 | Rattunde | 474/28 X |
| 4,403,974 | 9/1983 | Sherman et al. | 474/28 X |

FOREIGN PATENT DOCUMENTS 0193962 11/1983 Japan ....................... 474/28

Primary Examiner—Thuy M. Bui
Attorney, Agent, or Firm—Donald J. Harrington; Keith L. Zerschling

[57] ABSTRACT

An infinitely variable belt drive having a pair of belt clamping servos and a ratio control servo, a high pressure source connected to a common high pressure feed circuit for the clamping servos, a ratio control servo, a low pressure source that is independent of the high pressure source, and a high pressure accumulator and pressure amplifier system that is adapted to supply the clamping servos with a high pressure with minimal high pressure fluid flow.

5 Claims, 3 Drawing Sheets

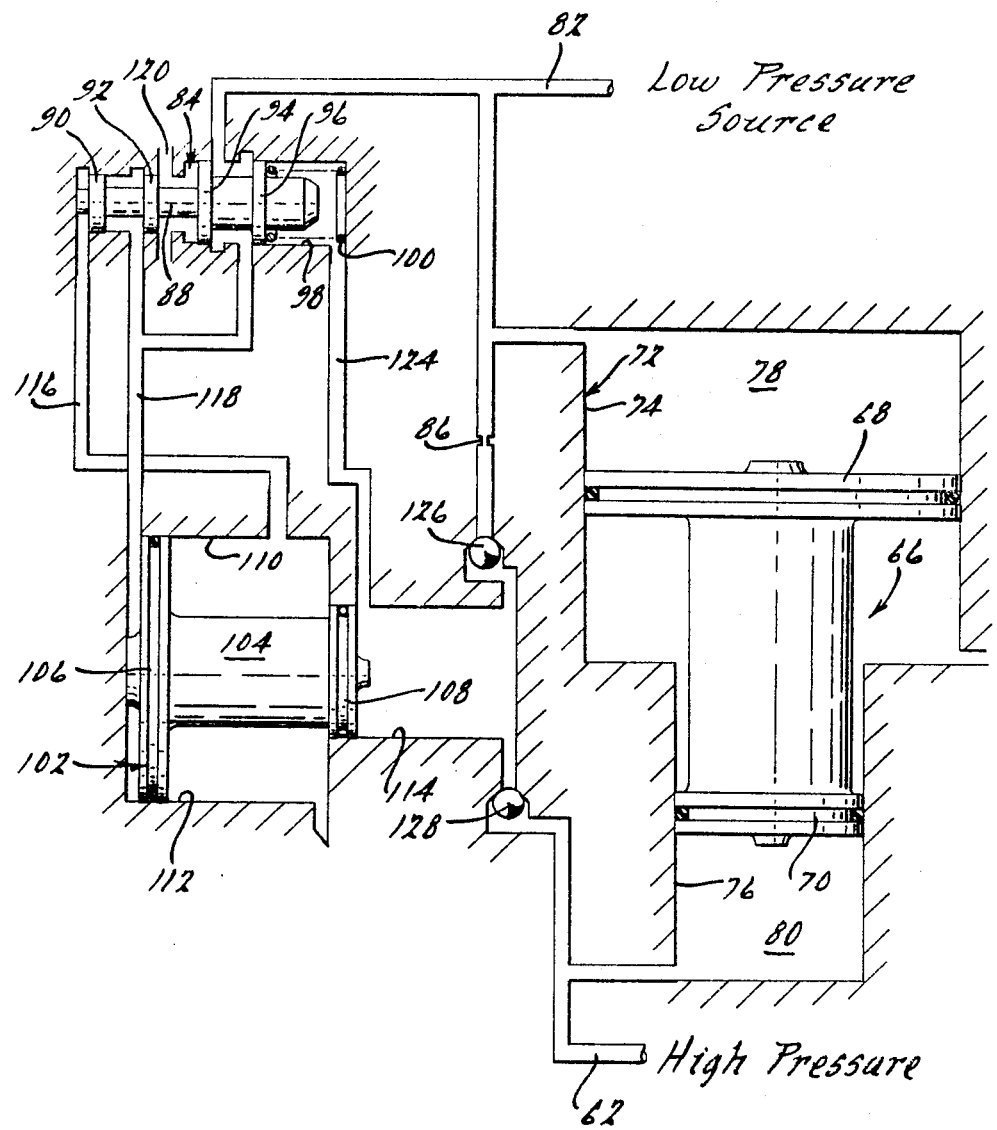

FLUID PRESSURE AMPLIFIER FOR AN INFINITELY VARIABLE DRIVE

BACKGROUND OF THE INVENTION

My invention relates generally to infinitely variable belt drives of the kind disclosed, for example, in my prior U.S. Pat. No. 3,115,049. Another transmission structure capable of embodying the improvements of my present invention is shown in U.S. Pat. No. 3,600,960.

Infinitely variable belt drives usually include adjustable sheaves located on parallel axes. The pitch of the sheaves can be changed to effect variations in torque ratio. One sheave serves as a torque input member and the other sheave serves as a torque output member.

These infinitely variable belt drives normally require axial clamping forces to prevent slippage of the belts with respect to the sheaves. The sheaves normally have conical surfaces situated in juxtaposed relationship and the axial distance between the sheaves can be changed thereby controlling the effective pitch diameter of the sheaves. To effect the clamping forces necessary to prevent belt slippage, hydraulic piston and cylinder assemblies are used. These act in cooperation with hydraulic piston and cylinder assemblies that are used to control the ratio.

The pressure for the control system necessary to achieve the torque ratio control and the belt clamping control is supplied by an oil pump that must be driven by the engine with which the transmission is used. Because of the high clamping forces necessary in the prior art constructions, the oil pump must achieve a high pressure and this results in high parasitic power loss.

BRIEF DESCRIPTION OF THE INVENTION

My invention comprises an infinitely variable belt drive that eliminates the requirement for a high pressure oil pump to maintain ratio control and belt loading. This is achieved by separating the axial belt loading function from the ratio control function. The pistons for the servos for the axial belt loading function and ratio control function are connected hydraulically together. They are connected also to a common high pressure source. During ratio changes when one pulley expands to effect a reduction in effective pulley pitch diameter, the other pulley will contract to effect an increase in its pitch diameter. The oil volume required to expand one pulley then is nearly all replaced by the oil displaced by the contracting pulley. The high pressure pump, therefore, needs to supply a net zero volume or only a very small volume to compensate for leakage or for differences in servo cylinder sizes. This source can be either a very small pump or a fluid pressure amplifier, the latter being a preferred embodiment described in this specification.

The ratio control is achieved by a piston that can be either concentric with the driving shaft or concentric with the driven shaft. The ratio control can be operated by a transmission control pressure pump, and this of necessity is considerably lower than the pressure that is required for the clamping forces on the other pulley assembly.

Because the volume of fluid that must be supplied by the pump is relatively small using this improved belt and sheave assembly, it may be supplied by means of my improved accumulator and pressure amplifier assembly. This makes it possible to provide a high pressure for clamping thereby eliminating the need for running the entire hydraulic control system at a high pressure.

BRIEF DESCRIPTION OF THE FIGURES OF THE DRAWINGS

FIG. 2a is a view similar to FIG. 2 although the free piston pump portion of the circuit is shown in a position that differs from the position shown in FIG. 2.

PARTICULAR DESCRIPTION OF THE INVENTION

Figure 1:
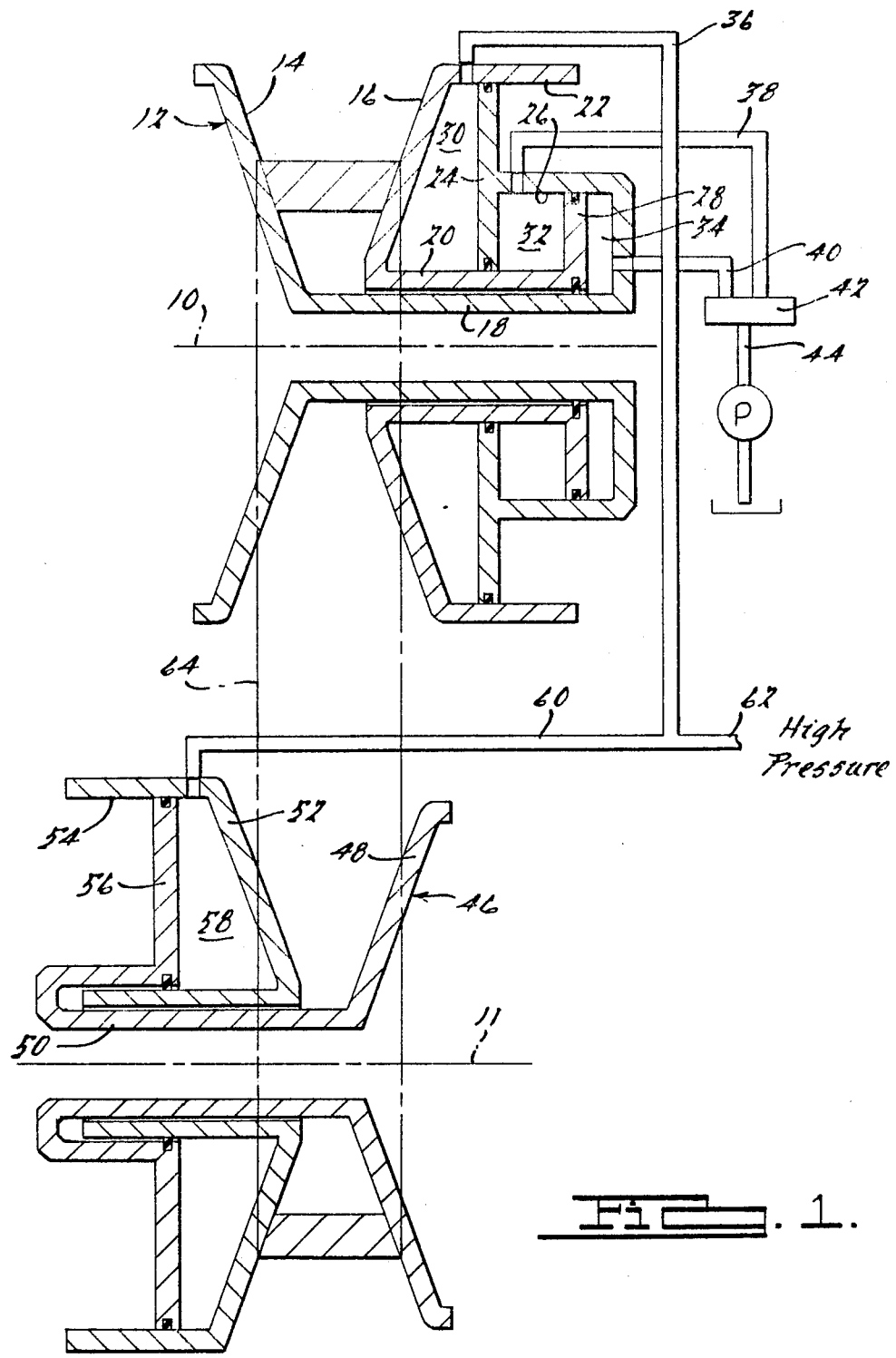
FIG. 1 is a schematic view in cross section showing the drive and driven portions of the belt and sheave assembly of an infinitely variable transmission adapted to use my invention.

In FIG. 1 a driving shaft is shown at 10 and the driven shaft is shown at 11. It is possible for the shaft 10 to be considered an output shaft and the shaft 11 to be considered an input shaft although for the purpose of this specification shaft 10 will be considered a torque input shaft.

A torque input sheave assembly 12 comprises a first cone portion 14 and a cooperating cone portion 16. Each cone portion 14 and 16 is provided with a conical surface arranged in juxtaposed relationship. Cone portion 14 is connected to or is formed integral with a central shaft 18 and a sleeve shaft 20 is received over the shaft 18 in axial sliding relationship. It is connected to or is integral with cone portion 16.

Cone portion 16 is formed as shown in FIG. 1 to define an annular cylinder 22 in which is positioned an annular piston 24. Piston 24 in turn forms a cylinder 26 and piston 28 is received in the cylinder 26 and is connected to the sleeve 20.

Piston 24 cooperates with the cylinder 22 to define a pressure chamber 30, and piston 28 cooperates with the cylinder 22 to define a pair of oppositively disposed pressure chambers 32 and 34.

Each of the pressure chamber 30, 32 and 34 is provided with a feed passage as seen respectively at 36, 38, and 40.

A ratio control valve shown schematically at 42 communicates with feed passages 38 and 40. It communicates also with a transmission control pressure supply passage 44. This pressure supply may be of a relatively low pressure. It may be the same pump that is used to supply pressure to the control system. My U.S. Pat. No. 3,115,049 shows a typical valve system that may be used in infinitely variable belt drives of this kind. The pump is driven by the engine for the vehicle with which the transmission is used. In a wheeled automotive vehicle driveline the ratio control valve responds to control variables such as output shaft speed and engine throttle position in a manner similar to the function of the system described in U.S. Pat. No. 3,115,049.

The driven shaft 11 has mounted thereon a driven sheave assembly 46 which comprises a first conical sheave portion 48 connected to or formed integrally with shaft 50, which is connected to the shaft 11. A cooperating conical sheave portion 52 is mounted on the shaft 50 and is adapted to move axially thereon although it is rotatably fast with respect to the shaft 50.

Sheave portion 52 defines a pressure cylinder 54 and a piston 56 is formed integrally with or connected to the shaft 50. Piston 56 in the cylinder 54 cooperate to define a pressure chamber 58. Chamber 58 is connected to pressure passage 36 through pressure passage 60. Passages 36 and 60 are connected to a common high pressure passage 62 which is pressurized by the accumulator valve system of FIG. 2.

A torque transmitting belt, preferably a steel belt or a belt of the kind shown in U.S. Pat. No. 3,115,049 is trained between the sheave assemblies 12 and 46. As the sheave portions 14 and 16 of assembly 12 expand, the effective pitch diameter of the sheave assembly decreases and the belt moves toward the axis of shaft 10. Simultaneously, the sheave portion 52 and 48 of the assembly 46 contract thereby increasing the effective pitch diameter of the sheave assembly 46. For purposes of the schematic drawing of FIG. 1, the belt is shown in outline form at 64. The edges of the belt, as seen in FIG. 1, contact the conical surfaces of the sheave assemblies 12 and 46. Torque is transmitted through the belt by reason of the tangential friction forces acting on the axial sides of the belt.

The effective torque ratio of the transmission is controlled by changing the effective pitch diameter of the assembly 12. This is done by introducing control pressure to chamber 34, thereby changing the pressure balance across the piston 28 established by the pressures in chambers 34 and 32. An increase in the relative pressures in chambers 34 and 32 will cause an increase of the speed ratio and a decrease in that pressure ratio will cause a decrease in the speed ratio. Clamping pressure on the belt is achieved by introducing a clamping pressure into chamber 30 of the sheave assembly 12. That same pressure is distributed to the pressure chamber 58 of the sheave assembly 46. The clamping pressure is distributed to the feed lines 60 and 36 from the common clamping pressure feed passage 62.

As the sheave assembly 12 expands the sheave assembly 46 contracts as explained previously. Thus the increase in the volume of chamber 30 during an increase in speed ratio is matched by a decrease in volume in the chamber 58. Therefore, the flow of fluid that must be distributed to the sheave assemblies from passage 62 is minimal if the diameter of the respective servo cylinders are nearly equal. Thus it is necessary only to provide a high pressure, rather than both a high pressure and a high flow, to maintain adequate clamping forces for permitting torque transmission between the torque assemblies through the belt.

The ratio control system 28 is entirely separate from the clamping pressure circuit. It is acted upon by a transmission control pressure which is considerably lower than the pressure that it required for clamping the belt to prevent slippage.

Figure 2:
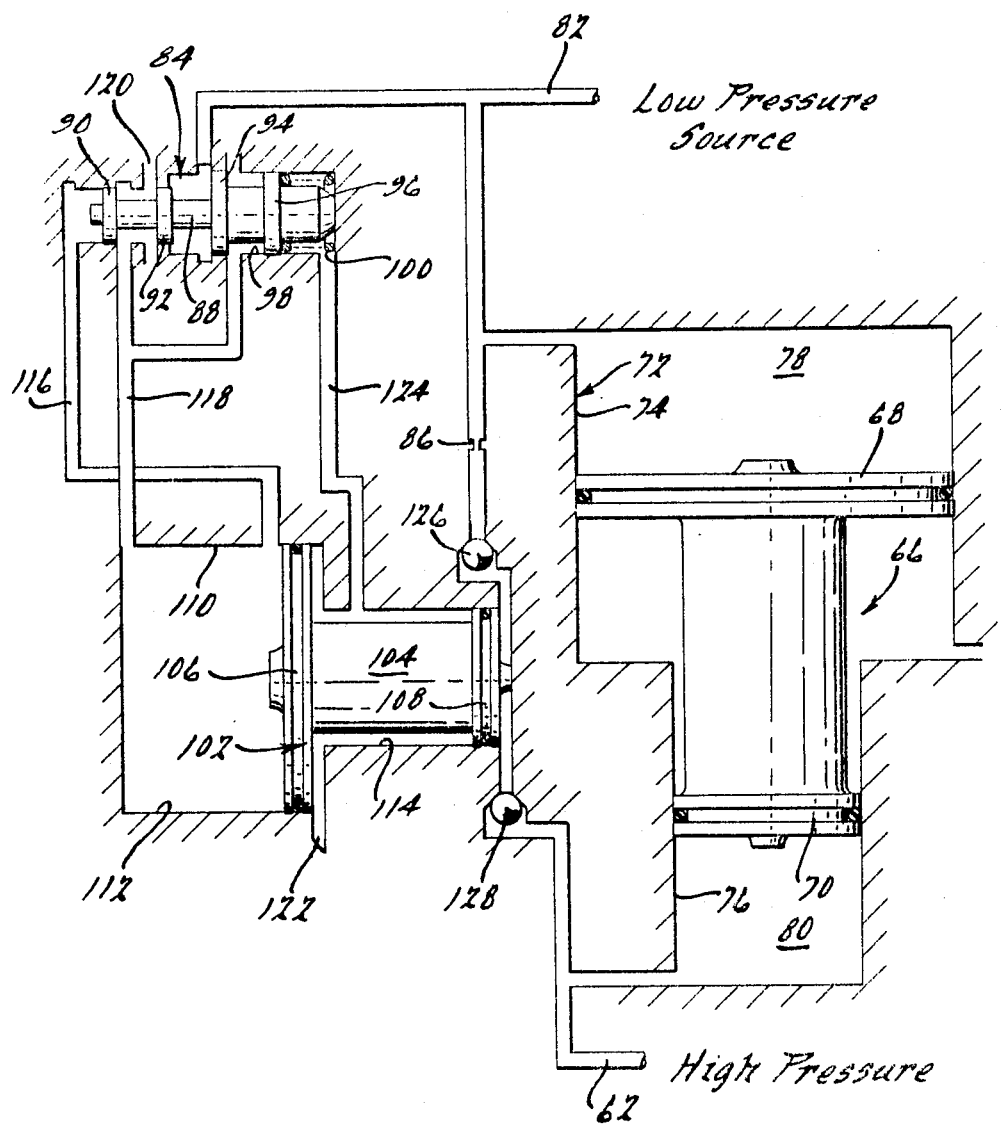
FIG. 2 is a schematic diagram of the valve circuit used to supply fluid under pressure to the servos for the transmission of FIG. 1.

The pressure in passage 62 is obtained from an accumulator valve system shown in FIG. 2. The pressure in passage 62 is high to effect the necessary clamping forces but it is not necessary to operate the entire hydraulic system for the transmission at that high pressure.

The accumulator valve system of FIG. 2 comprises an accumulator piston assembly 66. It includes a large diameter piston portion 68 and a small diameter piston portion 70. The piston assembly 66 is located in an accumulator cylinder 72 having a large diameter portion 74 for receiving piston portion 68, and a small diameter cylinder portion 76 for receiving small piston portion 70. Cylinder portion 74 and piston portions 68 define a large diameter accumulator chamber 78, and cylinder portion 76 and piston portion 70 define a small diameter pressure chamber 80.

Pressure chamber 78 communicates with a low pressure source which may be a transmission control pressure pump. For purposes of the schematic drawing of FIG. 2, the low pressure supply passage is shown at 82. Passage 82 communicates with a valve assemby 84 and with one side of a flow restricting orifice 86. Valve 84 comprises a valve spool 88 having spaced valve lands 90, 92, 94 and 96. Valve spool 88 is received within valve chamber 98. It is biased in a left hand direction as seen in FIG. 2 by valve spring 100. Passage 82 communicates with valve chamber 98 at a point intermediate lands 92 and 94. Land 94 is larger than land 92 so the force of the pressure in passage 82 creates a force on valve spool 88 that opposes the force of the spring 100.

A free piston pump 102 comprises a piston 104 having a large diameter portion 106 and a small diameter portion 108. Piston 104 is received in pump cylinder 110 having a large diameter portion 112 that reoeives piston portion 106 and a small diameter portion 114 that receives piston portion 108. The right hand side of cylinder portion 112 communicates with the left side of valve chamber 98 through passage 116. The left side of the cylinder portion 112 communicates with the valve chamber 98 at a location intermediate valve lands 90 and 92. The passage establishing that communication is shown at 118. An exhaust port 120 is located in the valve chamber 98 adjacent land 92 as shown. The left side of the free piston pump cylinder portion 112 communicates also with the valve chamber 98 at a location intermediate lands 94 and 96.

The right hand side of piston portion 106 and the right hand side of valve chamber 98 communicate with exhaust port 122 through exhaust passage 124.

A first check valve 126 provides for transfer of fluid from the downstream side of orifice 86 to the right hand side of the piston portion 108 but prevents flow in the opposite direction. A second one way check valve 128 provides for flow of fluid from the right hand side of the piston portion 108 to the small accumulator chamber 80 but prevents flow in the opposite direction.

When fluid pressure is supplied through the passage 82, it acts on the large end of the accumulator piston portion 68. The same pressure acts on the large diameter piston portion 106 of the free piston pump assembly as communication is established between passage 82 and 118. This condition is illustrated by the schematic diagram in FIG. 2a. Fluid pressure in passage 82 acts also on the small diameter piston portion 70 of the accumulator assembly as check valves 126 and 128 provide one-way pressure transfer to the pressure chamber 80. The same pressure that is transmitted to chamber 80 is transmitted to the right side of the piston portion 108.

If it is assumed that the accumulator piston is not fully stroked, it acts as a hydraulic intensifier causing the pressure on the small end of the accumulator in chamber 80 to be increased relative to the pressure in passage 82. The pressure in passage 62 thus is increased relative to the pressure in passage 82 by a factor equal to the area ratio of the piston portions 70 and 68.

The area ratio of the free piston pump is slightly larger than that of the accumulator piston so the fluid acting on the right hand of the piston portion 108 is forced through the check valve 128 into the high pressure circuit, which is connected, as mentioned previously, to the chamber 80 of the accumulator assembly. When the pump piston moves to the right, it opens a port in cylinder portion 112 whereby the large diameter chamber of the piston pump is connected through passage 116 to the left side of the valve chamber 98. The pressure from the low pressure source 82 then moves the valve spool to the right against the force of the spring 100. That condition is illustrated in FIG. 2. The ports of the valve spool are spaced so that exhaust port 120 first is closed as the valve spool is shifted, then the low pressure source is brought into communication with the valve chamber 98 at a location between lands 92 and 94, which creates a pressure force that moves the valve to the right thereby adding to the force that opposes the spring 100. As the valve moves further to the right, the large end of the pump piston becomes disconnected from the low pressure source and is vented through passage 118 and exhaust port 120. This also vents the left side of the valve spool 88 but the valve is held in the position shown in FIG. 2 by reason of the pressure acting on the differential diameter of lands 92 and 94.

The venting of the pump piston drops the pressure on both ends of the pump piston thus allowing low pressure fluid to flow into the small end of the cylinder portion 114 through check valve 126. At that instant check valve 128 prevents high pressure from escaping from the chamber 80.

The orifice 86 prevents pressure that acts on the differential diameter of lands 92 and 94 from decreasing from the point where it no longer can prevent the spring 100 from moving the valve. When low pressure fluid forces the pump piston completely to the left, passage 124 becomes connected to the low pressure source so the low pressure source is in communication with the right end of the valve spool. The valve spool then is forced to the left as indicated in FIG. 2a and the cycle is repeated.

When the valve moves to the left, it repressurizes the large end of the pump piston in the manner previously described before it vents the chamber between differential lands 92 and 94. If the piston were moved to the right and passage 124 were to become connected to exhaust 122 before the differential area of lands 92 and 94 become exhausted, the sequence would be halted. This does not occur, however, because when the passage 124 first is connected to the low pressure source, the pressure on the small end of the piston is nearly zero because the resistance of the piston to motion is very small. The pressure on the right end of the valve spool 88 does not move the valve until the free piston pump bottoms out and the passage 124 is fully opened. When the free piston pump begins its return stroke, its helps force oil out of the port to the end of the valve thus assuring that the valve is pulling to the left before the passage 124 is exhausted.

The accumulator maintains a constant pressure in the high pressure circuit. This pressure is equal to the accumulator piston ratio times the low pressure in passage 82. When the accumulator chamber 78 is completely filled, the accumulator piston assembly is grounded and the pressure is increased slightly to a value equal to the pressure in passage 82 times the area ratio of the pump piston. If there is no flow in the high pressure circuit and the accumulator is filled, the pump stalls and no fluid is taken from the low pressure source.

Having described a preferred embodiment of my invention, what I desire to secure by U.S. Letters Patent is:

1. In an infinitely variable belt drive comprising
driving and driven adjustable sheave assemblies and a torque transmitting belt between the sheave assemblies, each sheave assembly having relatively movable sheave portions with friction surfaces adapted to engage said belt;
one sheave portion of each sheave assembly being secured to a clamping servo cylinder and the other sheave portion thereof being movable axially relative to said one sheave portion and having secured thereto a clamping piston received in said cylinder;
a ratio control servo comprising a cylinder secured to said other sheave portion of one of said sheave assemblies and a ratio control piston in said cylinder of said ratio control servo secured to said one sheave portion of said one servo assembly, the diameter of said clamping piston being greater than the diameter of said ratio control servo;
the clamping piston of each servo cooperating with their respective clamping servo cylinders to define a high pressure chamber;
a high pressure fluid passage means connecting said high pressure chambers together and with a common high fluid pressure source whereby the decrease in volume of said one chamber during a ratio change causes displacement of fluid approximately equal in volume to the corresponding increase in volume of said other chamber whereby the fluid volume delivered by said high pressure source is minimal; and
said ratio control servo cylinder being secured to said clamping piston, said ratio control servo piston and cylinder defining opposed ratio control pressure chambers on either side of said ratio control piston, a source of control pressure, and ratio control fluid passage means including a ratio control valve connecting said control pressure source to said ratio control pressure chambers.

2. In an infinitely variable belt drive comprising
driving and driven adjustable sheave assemblies and a torque transmitting belt between the sheave assemblies, each sheave assembly having relatively movable sheave portions with friction surfaces adapted to engage said belt;
a pressure accumulator piston assembly with a high pressure chamber and a low pressure chamber, said high pressure chamber communicating with said ratio control fluid passage means and fluid pressure pump means for developing a low pressure communicating with and supplying pressure to said low pressure chamber;
one sheave portion of each sheave assembly being secured to a clamping servo cylinder and the other sheave portion thereof being movable axially relative to said one sheave portion and having secured thereto a clamping piston received in said cylinder;
a ratio control servo comprising a cylinder secured to said other sheave portion of one of said sheave assemblies and a ratio control piston in said cylinder of said ratio control servo secured to said one sheave portion of said servo assembly, the diameter of said clamping piston being greater than the diameter of said ratio control servo;
the clamping piston of each servo cooperating with their respective clamping servo cylinders to define a high pressure chamber;
a high pressure fluid passage means connecting said high pressure chambers together and with a common high fluid pressure source whereby the decrease in volume of said one chamber during a ratio change causes displacement of fluid approximately equal in volume to the corresponding increase in volume of said other chamber whereby the fluid volume delivered by said high pressure source is minimal; and said ratio control servo cylinder being secured to said clamping piston, said ratio control servo piston and cylinder defining opposed ratio control pressure chambers on either side of said ratio control piston, a source of control pressure, and ratio control fluid passage means including a ratio control valve connecting said control pressure source to said ratio control pressure chambers.

3. The combination as set forth in claim 1 wherein said high fluid pressure source comprises a fluid pressure accumulator having a large diameter cylinder with a large diameter piston thereon defining a large accumulator chamber and a small diameter cylinder with a small diameter piston therein defining a small accumulator chamber, said piston being adapted to move in unison whereby an increase in volume of said large accumulator chamber results in a decrease in volume of said small accumulator chamber, the latter being hydraulically connected to said high pressure chamber of said clamping servo cylinders;

a free piston pump comprising a pump piston with large and small portions movable respectively in large and small pump cylinders;

a source of low control pressure, passage means including a first one way flow valve element for admitting fluid from said low pressure source to said small pump cylinder when said pump piston moves in one direction and a second one way flow valve element for delivering high pressure from said small pump cylinder to said small accumulator chamber; and a pump control valve means including a shiftable valve element and passages for connecting said large pump cylinder to said low pressure source when said valve element assumes one position and for exhausting said large pump cylinder when it assumes a second position, said passages including a control passage connecting said valve element to said large pump chamber at a location near the small pump chamber whereby said valve element is biased toward said second position by a pressure force, and spring means for biasing said valve element in the opposite direction.

4. The combination as set forth in claim 3 wherein said valve element has lands thereon that define a differential area, and an exhaust port in said control valve means communicating with said differential areas when said valve element is in said one position, said low pressure source communicating with said differential area when said valve element is in said second position.

5. The combination as set forth in claim 4 wherein said passages include another control passage connecting said valve element to the small pump chamber near the large pump chamber whereby said valve element is biased toward said first position by a pressure force.

* * * * *